United States Patent [19]

Walsh et al.

[11] 4,038,460
[45] July 26, 1977

[54] HALOGEN COMPLEXING ETHERS

[75] Inventors: Fraser M. Walsh, Arlington; Dennis N. Crouse, Melrose; Alfred M. Ajami, Boston, all of Mass.

[73] Assignee: Eco-Control, Inc., Cambridge, Mass.

[21] Appl. No.: 667,685

[22] Filed: Mar. 17, 1976

[51] Int. Cl.² ..................... H01M 8/08; H01M 4/60
[52] U.S. Cl. ...................................... 429/15; 429/29; 429/50; 429/70; 429/101; 429/198
[58] Field of Search .............. 429/15, 46, 101, 105, 429/198, 201, 199, 13, 50, 51, 21, 70

[56] References Cited

U.S. PATENT DOCUMENTS 3,811,945  5/1974  Rossi ............................... 429/198
3,816,177  6/1974  Walsh .............................. 429/201

Primary Examiner—Donald L. Walton
Attorney, Agent, or Firm—Anthony M. Lorusso

[57] ABSTRACT

Halogen complexing ethers are disclosed as an additive for use in complexing halogen in cells and batteries of the type which utilize the electrochemical reaction $X_2 \rightleftarrows 2X^-$, where X is Br, Cl, I or mixtures thereof. The ethers form insoluble oil-like complexes with the halogens which prevent the halogens from being dissolved in the electrolyte of the cell or battery in which they are used.

23 Claims, 4 Drawing Figures

HALOGEN COMPLEXING ETHERS

BACKGROUND OF THE INVENTION

This invention relates to compounds useful for complexing halogens and more particularly to compounds useful as an electrolyte additive for electrochemical cells and batteries of the type which utilize a halogen as its electrochemically active agent.

Voltaic cells which include an aqueous solution of zinc or cadmium halide as an electrolyte are known, but are frequently characterized by a relatively high self-discharge rate, low capacity, and high internal resistance. Since elemental halogen is soluble in the aqueous electrolyte, it is difficult to keep metallic zinc or cadmium and elemental halogen apart while simultaneously achieving a system in which a good percentage of the theoretical energy storage capacity can be realized.

Recently, various attempts have been made to prevent elemental halogen from migrating to the zinc or cadmium electrode. For example, U.S. Pat. No. 3,352,720 to G.R. Wilson et al. teaches the use of water insoluble polymeric amine halogen complexes in place of the elemental halogen. While the structures disclosed by Wilson et al. function as halogen cells, they nevertheless suffer from less than optimum capacities and self-discharge rates because of the low stability of the polyhalogens employed.

U.S. Pat. No. 3,816,177 to Myles A. Walsh teaches the use of soluble quaternary ammonium halides and the like which may be dissolved in the electrolyte together with a water soluble depolarizer. When elemental halogen is released into the electrolyte, it combines with the quaternary halide to form a quaternary polyhalide which complexes with the depolarizer to form an insoluble, halogen rich, oil-like complex. If an inert electrode made of a material which absorbs the insoluble complex is employed, an improved cell is provided, since the complex is relatively stable and since the halogen molecules, being concentrated about the current collector, are available for electrochemical reaction to an improved degree.

Still another improvement in halogen electrochemical cells is disclosed in U.S. Patent Application Ser. No. 652,780 to M.A. Walsh et al. entitled *Halogen Electrode*, filed on Jan. 27, 1976. The structure disclosed by this application is a novel electrode which comprises a current collecting matrix which has an extremely stable polymer containing quaternary ammonium, phosphonium, or sulfonium sites incorporated into its structure. Since the polymer is formed in the presence of a high surface area, porous, current collecting matrix, the electrodes are capable of storing halogens in a non-chemically active but highly electrochemically active state in such a manner that uniform, intimate electrical contact is maintained between the halogen-rich sites of the polymer and the current collector, and interaction between halide in the electrolyte and the quaternary sites is greatly facilitated.

The instant invention constitutes a further improvement in the halogen cell art and provides a large number of compounds, any one of which may be added to the electrolyte of halogen cells of the type described. The compounds of the invention eliminate the necessity of a depolarizer or a specially fabricated electrode, yet provide increased halogen complexing ability, enhancing the shelf-life and capacity of the cells and batteries in which they are used.

SUMMARY OF THE INVENTION

In general, the invention features compounds useful as additives to the electrolyte of halogen cells and batteries for complexing halogen. The additive is chosen from the group consisting of compounds having the formula:

Linear

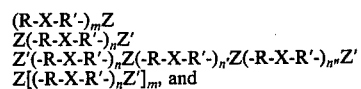

Cyclic

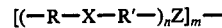

where R may equal R', Z may equal Z', R and R' are aliphatic groups containing 1 to 8 carbon atoms, $n$, $n'$, and $n''$ are numbers from 1 to 100, $m$ is a number from 1 to 6, Z and Z' are chosen from the large number of groups which do not render the additive's halogen complex crystalline at 30° C, and X is an oxygen atom, H-C-OR'', or R'''-C-OR'', where R'' and R''' are aliphatic groups containing 1 to 6 carbon atoms. Z and Z' may be, for example, alkyls, amides, carbocycles, carboxylates, halocarbons, halides, hydrogen, phosphonates, siloxanes, sulfonates, sulfones, and sultones. Z and Z' may also be chosen from among halogen complexing functionalities such as ammoniums, ammonium hydrohalides, amidimidines, amine oxides, betaines, esters, hydroxyls, nitriles, phosphobetaines, phosphoniums, pyridiniums, pyridyls, quaternary ammoniums, quarernary O-alkyl hydroxylammoniums, sulfobetaines, sulfoniums, sydnones, tertiary amines, tertiary amine hydrohalides, and combinations thereof. The compounds of the invention, when combined with one or more molar equivalents of halogen, form a halogen rich liquid which is substantially insoluble in aqueous metal halide solutions at 30° C and which, if desired, may be used to drive certain fuel cells.

Accordingly it is an object of the invention to provide a halogen complexing ether useful as an electrolyte additive for cells and batteries of the type described which, by complexing elemental halogen in the electrolyte, is capable of greatly improving the performance of halogen utilizing electrochemical systems.

Another object of the invention is to provide a large number of compounds, any of which may be added to zinc or cadmium halide electrolytes to complex and hold halogens more efficiently than the aforementioned polymeric amine halogen complexes and the quaternary ammonium polyhalide - depolarizer systems, thereby increasing shelf life and decreasing self-discharge of the primary and secondary cells and batteries in which the complexing compound is used.

Yet another object of the invention is to provide a compound capable of complexing halogens in an electrochemical cell or battery which eliminates the necessity of adding a depolarizer to the electrochemical system.

Still another object of the invention is to provide compounds which, when complexed with one or more molar equivalents of halogen for every oxygen atom in the compounds, comprise insoluble liquids in aqueous metal halide solutions when maintained at 30° C and which partition from the aqueous electrolyte to provide a source of halogen that may be utilized in a halogen cell or battery.

Yet another object of the invention is to provide compounds which, when complexed and maintained below 30° C with one or more molar equivalents of halogen, comprise reasonably conductive liquids and therefore allow the halogens to undergo electrochemical reduction on the electrode of a halogen cell or battery at a reasonable rate.

Another object of the invention is to provide a large number of compounds which do not form crystalline zincates when placed in aqueous zinc halide solutions.

Still another object of the invention is to provide compounds which, when complexed with one or more molar equivalents of halogen for every oxygen atom in the compounds, comprise liquids at 30° C which can be pumped and stored indefinitely, thereby being suitable for use in a regenerative fuel cell or battery for storing bromine, and which do not structurally alter carbon electrodes or most halogen degradable plastics.

DESCRIPTION OF THE PREFERRED EMBODIMENT

Figure 1:
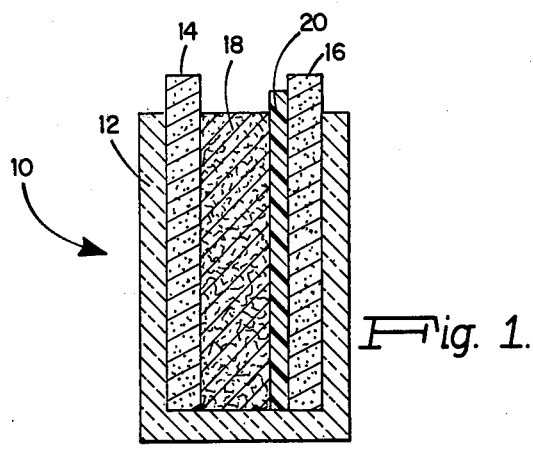
FIG. 1 is a cross-sectional view of a cell of the type with which the complexing compounds of the invention are useful.

At the outset, it is desirable to comment on certain terms that are used throughout this specification and claims. For example, the terms "zinc electrode" and electrode" are not intended to imply that the electrodes are formed from these materials exclusively. As is conventional practice, the terms are used merely to indicate the electrochemically active element reacting. The metal and halogen electrodes of the cells with which the compounds of the present invention are employed, are electrochemically conductive, and preferably porous. Carbon in its various forms is a preferred material. The carbon of the metal electrode serves as a plating surface for the reactive metal.

Furthermore, although reference is made to one counter electrode and one metal electrode, it is obvious that the compounds of the invention are useful in cells which include more than one pair of electrodes and with batteries of two or more cells constructed in accordance with methods known to thoses skilled in the art. Because cadmium is electrochemically similar to zinc, it is also obvious that the zinc of the electrode and the electrolyte can be replaced by cadmium. Although bromine is used throughout this specification and claims, it will be apparent to those skilled in the art that chlorine, iodine, or any combination of bromine, chlorine, and iodine may be substituted therefor. Although reference is made to the addition of one ether additive, a compatible mixture of ether additives may be used in any one cell.

During discharge of the well known zinc bromine cell, the following half reactions occur:

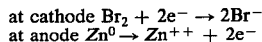

at cathode $Br_2 + 2e^- \rightarrow 2Br^-$
at anode $Zn^0 \rightarrow Zn^{++} + 2e^-$ On charging, the reactions are reversed:
at cathode $2Br^- \rightarrow Br_2 + 2e^-$
at anode $Zn^{++} + 2e^- \rightarrow Zn^0$ The zinc bromide of the electrolyte is hence consumed during charging and produced during discharging. In order for the cell to function properly, $Br_2$, which obviously must be present near the cathode when the cell is undergoing discharge, must somehow be stored. Since $Br_2$ is soluble in water containing solubilized metal halides, precautions must be taken to prevent it from migrating through the aqueous electrolyte and reacting directly with the metallic zinc at the anode. This goal has been reached by incorporating a porous, conducting, preferably carbon matrix of the type disclosed in U.S. Pat. No. 3,816,177 to M.A. Walsh, entitled *Secondary Cells and Batteries,* the disclosure of which is incorporated herein by reference, and one or more of the compounds of the invention, into an otherwise conventional halogen cell. When the electrolyte with the ether of the invention is absorbed into the porous electrode, bromine produced during charging is complexed by the ether and prevented from solubilizing in the aqueous electrolyte.

It is known that ethers can form a complex with halogens. See, for example, South African Patent No. 68/8126 to Robert H. Juda et al., entitled *Bromine Alkyl Aryl Polyalkyleneoxy Alkanol Compositions.* In accordance with the present invention, it has been discovered that some ethers or polyethers are quite effective for storing the halogens disclosed above, especially bromine, in an electrochemically active but non-chemically active state and that the performance of the halogen cells and batteries may be significantly improved if such compounds are added to conventional zinc or cadmium halide electrolyte.

The complexing compounds of this inventions are substances having the following structural formulae:

Linear $(R-X-R')_m Z$
$Z(-R-X-R'-)_n Z'$
$Z'(-R-X-R'-)_n Z(-R-X-R'-)_n \cdot Z(-R-X-R'-)_{n'} Z'$
$Z[(-R-X-R'-)_n Z']_m$, and Cyclic

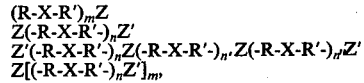

where R may equal R', Z may equal Z', R and R' are aliphatic groups containing 1 to 8 carbon atoms, $n$, $n'$, and $n''$ are numbers from 1 to 100, $m$ is a number from 1 to 6, and Z and Z' are chosen from among a large group of chemical functionalities which prevent crystallization of the complex at 30° C, and X is an oxygen atom, H-C-OR" or R"'-C-OR", where R" and R"' are aliphatic groups containing 1 to 6 carbon atoms. In addition, Z and Z' may be chosen to increase the amount of halogen held in the complex or to increase its chemical stability. These functional groups include, but are not limited to: neutral groups such as alkyls, amides, carbocycles, esters, halocarbons, halides, hydrogen, hydroxyls, nitriles, phosphonate esters, pyridyls, siloxanes, sulfonate esters, sulfones, sultones, and tertiary amines; amphoteric groups such as amidimidines, betaines, phosphobetaines, sulfobetaines, and amine oxides; meso-ionic groups such as sydnones; anionic groups such as carboxylates, phosphonates, and sulfonates; cationic groups such as ammoniums, ammonium hydrohalides, phosphoniums, pyridiniums, quaternary ammoniums, quaternary O-alkyl hydroxylammoniums, and tertiary amine hydrohalides. Ammonium, ammonium hydrohalide, amidimidine, amine oxide, betaine, cyano, ester, hydroxyl, phosphobetaine, phosphonium, pyridinium, pyridyl, quaternary ammonium, quaternary O-alkyl hydroxylammonium, sulfobetaine, sulfonium, sydnone, and tertiary amine hydrohalide are non-limiting examples of functionalities which provide additional halogen complexing capability.

If an ether additive with a cyclic structure is chosen for the halogen complexing agent, the ring must contain dissymmetry sufficient to prevent its respective halogen complexes from crystallizing at 30° C. Cyclic ethers such as N-substituted-N-methyl-morpholinium bromides, like the N,N-dimethyl morpholinium bromide disclosed in U.S. Pat. No. 3,816,177 to Myles A. Walsh, form crystalline tribromides with melting points in excess of 40° C and hence do not comprise embodiments of the instant invention. Because of the tribromides' inherent crystallinity and resulting viscosity at temperatures below about 50° C, they are less conductive by at least an order of magnitude when compared with the complexes of the present invention. This results in slow discharge rates of N-substituted-N-methyl-morpholinium tribromides below 50° C. Above 40° C, the chemical stability of the N-substituted-N-methyl-morpholinium perbromides come into question as evidenced by a slow production of HBr.

Further, Z cannot comprise functionalities which are capable of reacting irreversibly with bromine. In this regard, Z should not comprise any phenyl or polycyclic aromatic groups, especially such groups substituted with electron donating groups such as alkyl or alkoxy which greatly enhance irreversible electrophilic bromination of aromatic rings. Other readily halogenatable molecules such as ketones, olefins, acetylenes, and aldehydes are also unsuitable. Accordingly, the polyethers disclosed in the above-mentioned South African patent do not comprise embodiments of the instant invention since the alkyl substituted phenoxy group reacts with bromine as follows:

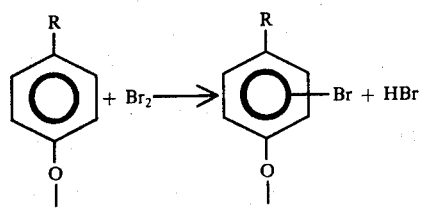

Ethers of the present invention, when used in voltaic halogen cells and batteries to store bromine, are advantageous because no other compound need be added, and, as will be explained below, they complex with halogens more efficiently than the two-part system described in U.S. Pat. No. 3,816,177, thereby increasing shelf-life and decreasing self-discharge of the cells. Because the ether-bromine complexes of the compounds of the instant invention remain fluid below 30° C, they are capable of being discharged at low temperatures.

The mechanism by which halogens are believed to be complexed with these ethers is diagrammed below (see E.Y. Gorenbein, N.O. Labkovskaya, and I.L. Abarbarchuk, Zh. Obshch. Khim. 35, 1921 (1965); CA 64:6481a (1966).

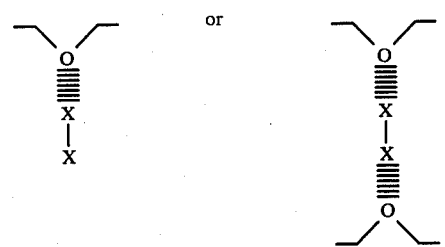

where X is the halogen.

Thus as the number of ether groups in a given compound is increased, the compound's capacity to hold $Br_2$, $Cl_2$, $I_2$, or a polyhalide is increased. However, competing interactions and steric influences also affect the complexing, and in practice, the relationship of the amount of halogen complexed to the number of ether groups present is non-linear.

Methods of synthesizing compounds of the type described above are generally well known in the art; see, for example, Satkowski and Hsu, *Polyoxyethylation of Alcohol*, Industrial and Engineering Chemistry, Vol. 49, page 1875 (1957). The procedure in the Satowski reference may be summarized as follows:

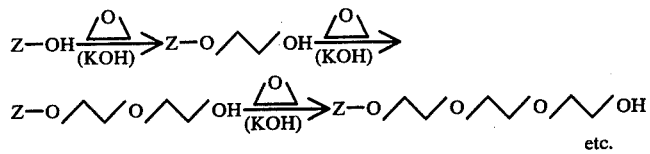

An alternative method for production of these compounds involves the functionalization of a bromo-ether or bromo-polyether, see, for example, Major and Cline, U.S. Pat. No. 2,049,463 (1936). The procedure in the Major patent may be summarized as follows:

$$Z + R-X-R'-Br \rightarrow R-X-R'-Z^+Br^-$$

Various modifications, well known to those skilled in the art, can produce a wide variety of the types of compounds disclosed. Alkylation of commercially available hydroxyethyl amines may be used to advantage, and functionalities capable of complexing halogen other than the ether groups may be incorporated. One successful compound was prepared as follows:

In a 100 ml round-bottomed flask, 25% trimethyl amine in methanol (35.5g) is stirred and cooled to 0° C while 2-bromoethyl ethyl ether (15.3 g) is added dropwise. The reaction mixture is warmed to 25° and stirred overnight. The methanol and excess trimethyl amine are removed at reduced pressure, and the solid residue is crystallized from methanol-acetone yielding 18.4g (84%) of a white crystalline ether (ECO-2) according to the reaction:

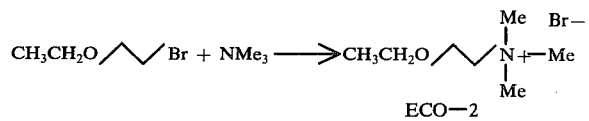

ECO—2

Water soluble dipolar additives such as tetramethylene sulfone (sulfolane) tend to decrease the halogen holding power of the ethers. Water insoluble additives such as halogenated hydrocarbons (methylene chloride) also slightly decrease the halogen holding power of the ethers.

Referring to FIG. 1, a cell 10 is shown which comprises a case 12, a pair of graphite electrodes 14, 16, a graphite-felt mass 18, and a porous polymeric separator 20. Graphite electrode 14 acts as the bromine electrode; electrode 16 acts as the zinc electrode. Electric leads (not shown) are connected to the electrode by means of clips. Electrodes 14, 16 have a porosity of 26%. Suitable graphite felt is available commercially from Union Carbide Corporation (VWF grade), and a suitable separator may be purchased from W.R. Grace, Inc. under the tradename DARAMIC.

Figure 4:
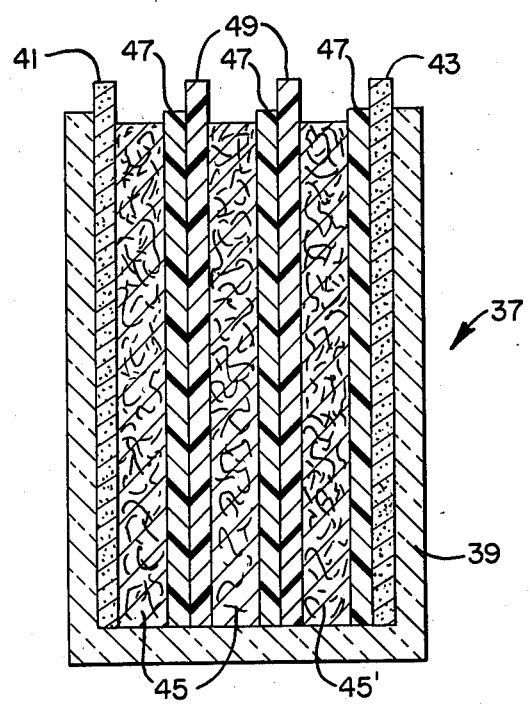
FIG. 4 is a cross-sectional view of a battery of the type with which the complexing compounds of the invention are useful.

FIG. 4 depicts a bipolar, multi-celled battery 37 of the type which utilizes the additive of the invention. It comprises a glass, water-tight case 39 which encloses a pair of graphite plate current collectors 41, 43. Plate 43 serves as a metal electrode. Interposed between the current collectors 41, 43 is an array of graphite felt masses 45 which serve as counter electrodes. A porous polymeric separate 47 (Deramic, approximately 0.125 in. thick) and a bipolar electrode 49 (conductive polymer film made by Conductive Polymer Corporation, Marblehead, Massachusetts, approximately 0.020 in. thick) are in turn interposed between each graphite felt mass 45. The number of cells in the battery, of course, may be increased or decreased as desired.

The electrolyte of the above described electrochemical system, which are contained in the felt masses, comprises aqueous solutions of inorganic salts, such as zinc halide, or cadmium halide, up to 50% of one or more of the compounds described above, and may include 0 to 30% of one or more of various well known additives for improved plating.

To demonstrate the effect of the compounds of the invention, a cell with a stationary electrolyte as described above was charged until more than 80% of the zinc halide initially in solution was converted into zinc and halogen. Charging current densities ranged typically from 5 to 25 amperes per square foot. All cells were tested at a contant current drain for a variety of current densities.

Figure 2:
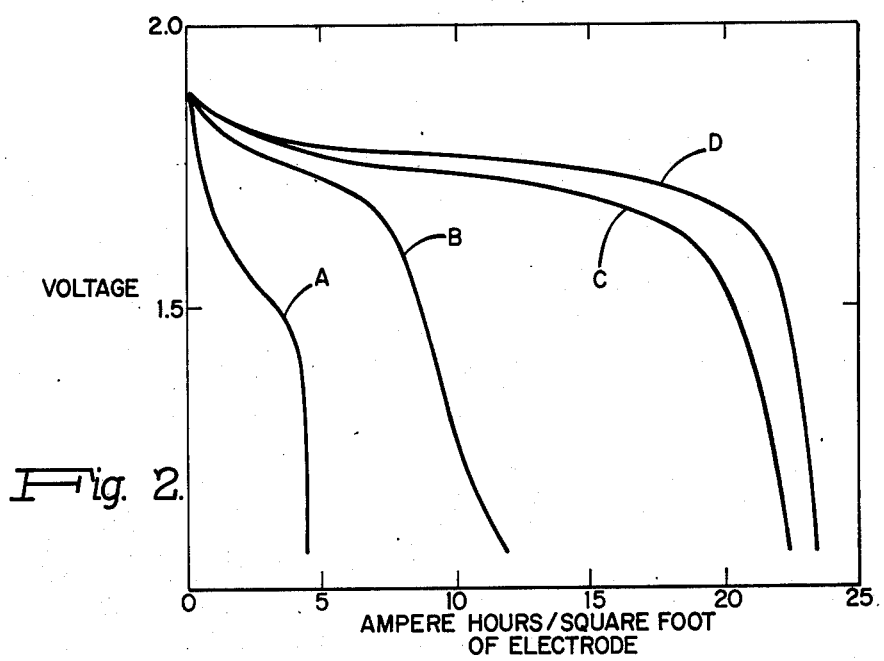
FIG. 2 is a graph of voltage vs. ampere hours/square foot of electrode surface which illustrates the improved storage capacity of cells constructed in accordance with FIG. 1 when a complexing compound of the invention is added to the electrolyte.

Data obtained from these tests are summarized in FIG. 2. The curves were obtained by measuring ampere hours of current output, at various voltages, for cells with a stationary electrolyte which had been charged as described above. For the curve labeled A, the electrolyte consisting of 0.4M $ZnBr_2$ and 0.2M $ZnSO_4$ in water. For B, the electrolyte consisted of 0.4M $ZnBr_2$, 0.2M $ZnSO_4$, and 7% by volume BL-330, an aliphatic polyether available commercially from GAF Corporation. The electrolyte of C comprised 0.4M $ZnBr_2$, 0.2M $ZnSO_4$, and 0.4M $(CH_3)_4NBr$ in 9:1, by volume, water to propylene carbonate. The electrolyte of D comprised 0.4M $ZnBr_2$, 0.2M $ZnSO_4$, and 5% by volume N,N'-bis-ethoxyethylene-N,N,N',N'-tetramethyl-2,2'-bis-ethyleneoxy diammonium dibromide (ECO-3). These curves demonstrate that a significantly greater number of ampere hours may be obtained from a cell whose electrolyte contains an ether compound of the invention, and that the ether compounds when added to the electrolyte, with or without other halogen complexing substances, increase cell capacity.

Figure 3:
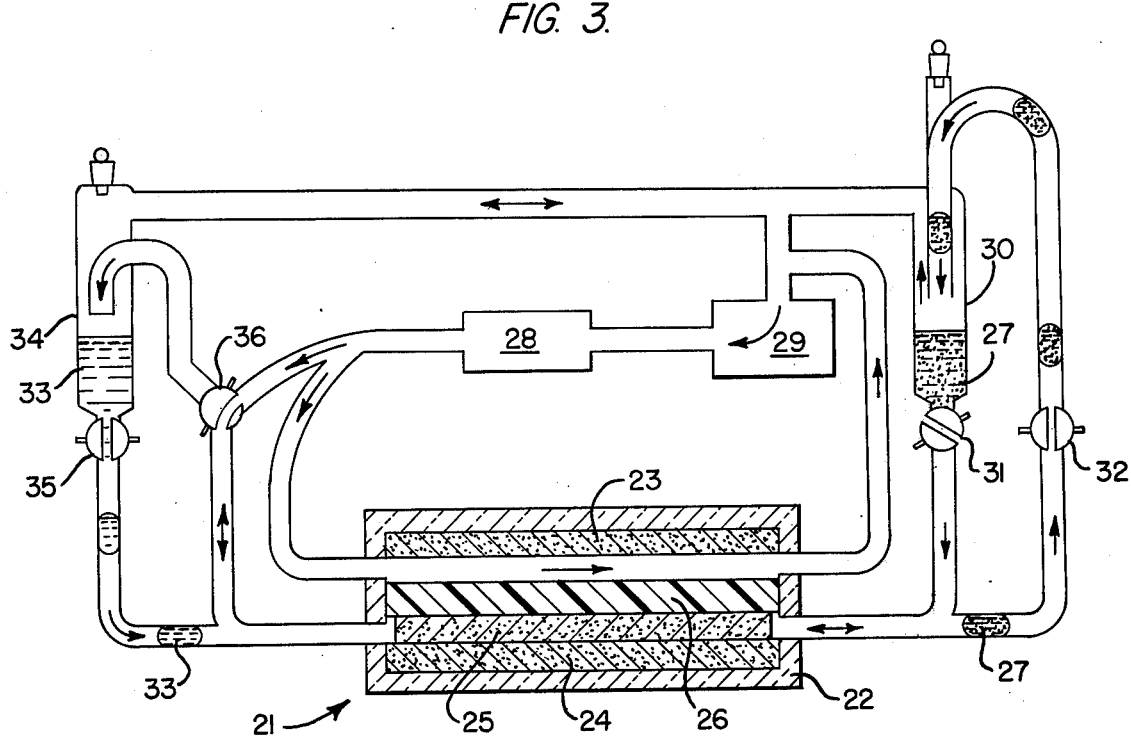
FIG. 3 is a schematic representation of a regenerative fuel cell with a recirculating electrolyte in which the complexing compounds of the invention are useful.

Referring to FIG. 3, a cell 21 is shown which utilizes a recirculating electrolyte containing a halogen complexing additive of the invention. The cell 21 comprises a case 22, a pair of graphite electrodes 23, 24, a graphite felt mass 25, and a porous polymeric separator 26. The equipment for storing the halogen complex 27 and providing fresh electrolyte, comprises a pump 28, an electrolyte reservoir 29, a halogen complex reservoir 30, and a pair of valves 31 and 32 for storing and releasing the halogen complex 27. During charging through terminals is attached to electrodes 23 and 24 (not shown), the halogen complex 27 is formed in the felt 25 from either a water soluble or water insoluble ether additive of the present invention, i.e. liberated $Br_2$ combines as disclosed above to from a $Br_2$ - ether complex. The resulting insoluble halogen complex 27 is pumped to reservoir 30 where, by opening valve 31, it can be drained back into felt 25 for consumption during discharge. The metal is plated out on electrode 23 during charge with the quanlity of the plate and plating characteristics dependent, inter alia, on flow rate. When a water insoluble ether additive 33 is employed, a storage reservoir 34 and a pair of valves 35 and 36, may be included for storing and releasing the ether additie 33. The electrolyte of the cell comprises inorganic salts, such as zinc halide, or cadmium halide, up to 50% of one or more of the compounds of the invention, and may include 0 to 30% of one or more of various well-known additives for improving plating characteristics. Those skilled in the art will appreciate that complex 27 may be used to drive cells other than the one illustrated in FIG. 3. For example, in addition to zinc and cadmium cells, the complexes will be useful in other halogen utilizing cells which may employ, for example, titanium, chromium, or hydrogen as an anode.

To demonstrate the effect of the compounds of the invention, a cell with a recirculating electrolyte as described above containing ECO-1 (see formula, infra) was charged at current densities ranging from 10 to 60 amperes per square foot for periods of time ranging from 1 to 3 hrs. The cell was tested at a constant current drain for a variety of current densitites and was demonstrated to have a coulombic efficiency of 50 to 80% and an energy efficiency of 40 to 60%. Without an ether additive of the present invention, no halogen complex 27 is formed, and the bromine, which dissolves in the electrolyte, reacts with the zinc plate on electrode 23 resulting in a coulombic and energy efficiency of less than 5%.

The following table illustrates that the halogen complexing property holds for a representative cross-section of the class of compounds of the invention. The data in this table were obtained by mixing the disclosed amount of bromine in two flasks, the first flask containing 5 ml of 2M $ZnBr_2$, and the second containing 5 ml of 4M $ZnBr_2$. Partitioning of the bromine complex and the aqueous phase was achieved by vigorous stirring for ½ hour at 25° C. Stirring for 18 hours under these conditions was shown to yield identical results. The bromine complex and aqueous phases were then separated by centrifugation and the aqueous phase was titrated for bromine.

As can be seen from a study of Table 1, the ether compounds of the invention (examples 3 and 6-12) complex a greater percentage of the available bromine as liquids than either a quaternary ammonium salt of example 1 or the quaternary ammonium salt-aprotic dipole (sulfolane) system of examples 2 and 5.

TABLE 1

| Complexing Compound | mM Br$_2$ | % Br$_2$ partioning in 5 ml aqueous phase with: | |
|---|---|---|---|
| | | 2M ZnBr$_2$ | 4M ZnBr$_2$ |
| 1) 1 QmBr* (3.28 mM) | 16.4 | (31%)+ | 16% |
| 2) QmBr* (3.28 mM) Sulfolane (400 mg) | 16.4 | 26% | 18% |
| 3) QmBr* (3.28 mM) GAF BL-330 (400 mg) | 16.4 | 12% | 8% |
| 4) QmBr* (3.28 mM) | 9.84 | (11%)+ | (6%)+ |
| 5) QmBr* (3.28 mM) Sulfolane (400 mg) | 9.84 | 13% | 9% |
| 6) ECO-1 (3.28 mM) | 9.84 | 10% | 8% |
| 7) ECO-1 (3.28 mM) Sulfolane (400 mg) | 9.84 | 14% | 11% |
| 8) ECO-2 (3.28 mM) | 9.84 | 12% | 9% |
| 9) ECO-2 (3.28 mM) Sulfolane (400 mg) | 9.84 | 14% | 12% |
| 10) ECO-3 (3.28 mM) | 9.84 | 7% | 5% |
| 11) ECO-3 (3.28 mM) Sulfolane (400 mg) | 9.84 | 9% | 6% |
| 12) ECO-4 (3.28 mM) | 9.84 | 8% | 5% |

*QmBr is phenyl trimethyl ammonium bromide
Sulfolane is tetramethylene sulfone
GAF BL-330 is an aliphatic polyether available from GAF Corporation
+The quarternary ammonium polybromide phase was crystalline ECO-1 is 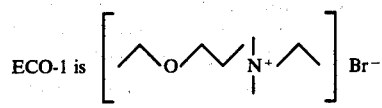 Br$^-$ ECO-2 is 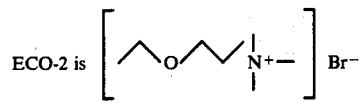 Br$^-$ ECO-3 is 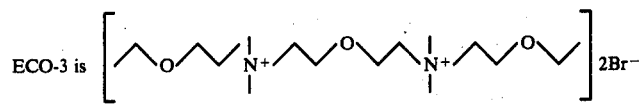 2Br$^-$ ECO-4 is 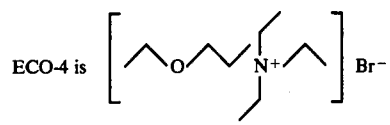 Br$^-$ ECO-1 Ethoxy-ethylene-N,N-dimethyl-N-ethyl ammonium bromide
ECO-2 Ethoxy-ethylene-N,N,N-trimethyl ammonium bromide
ECO-3 N,N'-Bis-Ethoxyethylene-N,N,N',N'-tetramethyl-2,2'-bis-ethyleneoxy diammonium dibromide
ECO-4 Ethoxy-ethylene-N,N,N-triethyl ammonium bromide The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for improving the performance of current delivering electrochemical systems of the type which utilize a substance selected from the group consisting of bromine, chlorine, iodine, polyhalogen complexes, and mixtures thereof as its electrochemically active agent, said process comprising adding to the electrolyte of said system an ether additive which exists as an insoluble liquid in aqueous metal halide solutions at 30° C in the presence of one or more molar equivalents of halogen per ether oxygen in the ether, said additive being selected from the group consisting of compounds aving the formulae:

a. (R-X-R')$_m$Z;
b. Z(-R-X-R'-)$_n$Z';

c. Z'(-R-X-R'-)$_n$Z(-R-X-R'-)$_{n'}$Z(-R-X-R'-)$_{n''}$Z';
d. Z[(-R-X-R'-)$_n$Z']$_m$; and e) 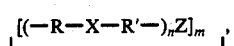

where R may equal R', Z may equal Z', R and R' are aliphatic groups containing 1 to 8 carbon atoms, $n$, $n'$, and $n''$ are numbers from 1 to 100, $m$ is a number from 1 to 6, Z and Z' are chemical groups which do not render the additive's halogen complex crystalline at 30° C and are incpable of substantial irreversible combination with bromine, chlorine, or iodine, and X is selected from the group consisting of an oxygen atom, H-C-OR", R'''-C-OR", and combinations thereof, wherein R" and R''' are aliphatic groups containing 1 to 6 carbon atoms.

2. The process as set forth in claim 1 wherein Z and Z' are selected from the group consisting of alkyls, amides, carbocycles, carboxylates, halocarbons, halides, hydrogen, phosphonates, siloxanes, sulfonates, sulfones, sultones, and combinations thereof.

3. The process as set forth in claim 1 wherein Z and Z' are selected from the group consisting of halogen complexing functionalities.

4. The process as set forth in claim 3 wherein Z and Z' are selected from the group consisting of ammoniums, ammonium hydrohalides, amidimidines, amine oxides, betaines, esters, hydroxyls, nitriles, phosphobetaines, phosphoniums, pyridiniums, pyridyls, quaternary ammoniums, quaternary O-alkyl hydroxylammoniums, sulfobetaines, sulfoniums, sydnones, tertiary amines, tertiary amine hydrohalides, and combinations thereof.

5. The process as set forth in claim 1 wherein the additive is an ether selected from the group consisting of Ethoxy-ethylene-N,N,N-triethyl ammonium bromide;
Ethoxy-ethylene-N,N-dimethyl-n-ethyl ammonium bromide;
Ethoxy-ethylene-N,N,N-trimethyl ammonium bromide; and,
N,N'-Bis-ethoxyethylene-N,N,N',N'-tetramethyl-2,2'-bis-ethyleneoxy diammonium dibromide.

6. An electrochemical cell comprising a case, a porous, conductive halogen electrode, an Me electrode, where Me is selected from the group consisting of zinc and cadmium, an aqueous electrolyte containing an inorganic salt of the formula MX, where M is selected from the group consisting of cadmium and zinc and X is selected from the group consisting of bromide, chloride, iodide, and combinations thereof, and an additive in said electrolyte comprising an ether compound which exists as an insoluble liquid in aqueous metal halide solutions at 30° C in the presence of one or more molar equivalents of halogen per ether oxygen in the additive, said additive being an ether selected from the group consisting of compounds having the formulae:
 a. (R-X-R'-)$_m$Z;
 b. Z(-R-X-R'-)$_n$Z';
 c. Z'(-R-X-R'-)$_n$Z(-R-X-R'-)$_{n'}$Z(-R-X-R'-)$_{n''}$Z';
 d. Z[(-R-X-R'-)$_n$Z']$_m$; and e)
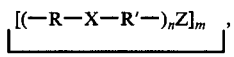

where R may equal R', Z may equal Z', R and R' are aliphatic groups containing 1 to 8 carbon atoms, n, n', and n" are numbers from 1 to 100, m is a number from 1 to 6, Z and Z' are chemical groups which do not render the additives' halogen complex crystalline at 30° C and are incapable of substantial irreversible combination with bromine, chlorine, or iodine, and X is selected from the group consisting of an oxygen atom, H-C-OR", R'''-C-OR", and combinations thereof wherein R" and R''' are aliphatic groups containing 1 to 6 carbon atoms.

7. The cell as set forth in claim 6 wherein Z and Z' are selected from the group consisting of alkyls, amides, carbocycles, carboxylates, halocarbons, halides, hydrogen, phosphonates, siloxanes, sulfonates, sulfones, sultones, and combinations thereof.

8. The cell as set forth in claim 6 wherein Z and Z' are selected from the group consisting of halogen complexing functionalities such as ammoniums, ammonium hydrohalides, amidimidines, amine oxides, betaines, esters, hydroxyls, nitriles, phosphobetaines, phosphoniums, pyridiniums, pyridyls, quaternary ammoniums, quaternary O-alkyl hydroxylammoniums, sulfobetaines, sulfoniums, sydnones, tertiary amines, tertiary amine hydrohalides, and combinations thereof.

9. The cell as set forth in, claim 6 wherein said additive is a compound selected from the group consisting of:

Ethoxy-ethylene-N,N,N-triethyl ammonium bromide;
Ethoxy-ethylene-N,N-dimethyl-N-ethyl ammonium bromide;
Ethoxy-ethylene-N,N,N-trimethyl ammonium bromide; and
N,N'-bis-ethoxyethylene-N,N,N',N'-tetramethyl-2,2'-bis-ethyleneoxy diammonium dibromide.

10. The cell as set forth in claim 6 wherein said cell is a secondary cell.

11. The cell as set forth in claim 6 further comprising means for storing the complex produced during charging.

12. The cell as set forth in claim 6 further comprising means for recirculating the electrolyte.

13. The cell as set forth in claim 12 further comprising means for storing said additive.

14. A water insoluble liquid complex substantially insoluble in water at 30° C for use in electrochemical cells of the type which utilizes a halogen selected from the group consisting of chlorine, bromine, iodine, polyhalogen complexes, and mixtures thereof, said complex consisting essentially of a substance selected from the group consisting of chlorine, bromine, iodine, polyhalogen complexes, and mixtures thereof combined with an ether selected from the group consisting of compounds having the formulae:
 a. (R-X-R'-)$_m$Z;
 b. Z(-R-X-R'-)$_n$Z';
 c. Z'(-R-X-R'-)$_n$Z(-R-X-R'-)$_{n'}$Z(-R-X-R'-)$_{n''}$Z';
 d. Z[(-R-X-R'-)$_n$Z']$_m$; and e)
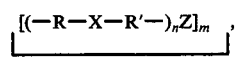

where R may equal R', Z may equal Z', R and R' are aliphatic groups containing 1 to 8 carbon atoms, n, n', and n" are numbers from 1 to 100, m is a number from 1 to 6, Z and Z' are chemical groups which do not render the complex crystalline at 30° C and are incapable of substantial irreversible combination with bromine, chlorine, or iodine, and X is selected from the group consisting of an oxygen atom, H-C-OR", R'''-C-OR", and combinations thereof, wherein R" and R''' are aliphatic groups containing 1 to 6 carbon atoms.

15. The complex as set forth in claim 14 wherein Z and Z' are selected from the group consisting of alkyls, amides, carbocycles, carboxylates, halocarbons, halides, hydrogen, phosphonates, siloxanes, sulfonates, sulfones, sultones, and combinations thereof.

16. The complex as set forth in claim 14 wherein Z and Z' are selected from the group consisting of halogen complexing functionalities.

17. The complex as set forth in claim 14 wherein Z and Z' are selected from the group consisting of ammoniums, ammonium hydrohalides, amidimidines, amine oxides, betaines, esters, hydroxyls, nitriles, phosphobetaines, phosphoniums, pyridiniums, pyridyls, quaternary ammoniums, quaternary O-alkyl hydroxylammoniums, sulfobetaines, sulfoniums, sydnones, tertiary amines, tertiary amine hydrohalides, and combinations thereof.

18. The complex as set forth in claim 14 wherein said ether is selected from the group consisting of:
Ethoxy-ethylene-N,N,N-triethyl ammonium bromide;
Ethoxy-ethylene-N,N-dimethyl-N-ethyl ammonium bromide;
Ethoxy-ethylene-N,N,N-trimethyl ammonium bromide; and
N,N'-Bis-ethoxyethylene-N,N,N',N'-tetramethyl-2,2'-bis-ethyleneoxy diammonium dibromide.

19. A battery of the type including a casing, an Me electrode, where Me is a metal selected from the group consisting of cadmium and zinc, a plurality of counter electrodes spaced apart from said Me electrode, a bipolar electrode interposed between each adajcent pair of said counter electrodes, an aqueous electrolyte containing an inorganic salt of the formula MX, where M is selected from the group consisting of cadmium and zinc and X is selected from the group consisting of bromide, chloride, iodide, and combinations thereof, and an additive in said electrolyte comprising an ether compound, which exists as an insoluble liquid in aqueous metal halide solutions at 30° C in the presence of one or more molar equivalents of halogen per ether oxygen in the additive, said additive being selected from the group consisting of compounds having the formulae:
a. $(R-X-R'-)_m Z$;
b. $Z(-R-X-R'-)_n Z'$;
c. $Z'(-R-X-R'-)_n Z(-R-X-R'-)_{n'} Z(-R-X-R'-)_n Z'$;
d. $Z[(-R-X-R'-)_n Z']_m'$ and e) $[(-R-X-R'-)_n Z]_m$, where R may equal R', Z may equal Z', R and R' are aliphatic groups containing 1 to 8 carbon atoms, $n$, $n'$, and $n''$ are numbers from 1 to 100, $m$ is a number from 1 to 6, Z and Z' are chemical groups which do not render the additives' halogen complex crystalline at 30° C and are incapable of substantial irreversible combination with bromine, chlorine, iodine, and X is selected from the group consisting of an oxygen atom, H-C-OR", R'''-C-OR", and combinations thereof wherein R" and R''' are aliphatic groups containing 1 to 6 carbom atoms.

20. The battery as set forth in claim 19 where Z and Z' are selected from the group consisting of alkyls, amides, carbocycles, carboxylates, halocarbons, halides, hydrogen, phosphonates, siloxanes, sulfonates, sulfones, sultones, and combinations thereof.

21. The battery as set forth in claim 19 wherein Z and Z' are selected from the group consisting of halogen complexing functionalities such as ammoniums, ammonium hydrohalides, amidimidines, amine oxides, betaines, esters, hydroxyls, nitriles, phosphobetaines, phosphoniums, pyridiniums, pyridyls, quaternary ammoniums, quaternary O-alkyl hydroxylammoniums, sulfobetaines, sulfoniums, sydnones, tertiary amines, tertiary amine hydrohalides, and combinations thereof.

22. The battery as set forth in claim 19 wherein said additive is a compound selected from the group consisting of:
Ethoxy-ethylene-N,N,N-triethyl ammonium bromide;
Ethoxy-ethylene-N,N-dimethyl-N-ethyl ammonium bromide;
Ethoxy-ethylene-N,N,N-trimethyl ammonium bromide; and
N,N'-bis-ethoxyethylene-N,N,N',N'-tetramethyl-2,2'-bis-ethyleneoxy diammonium dibromide.

23. The battery as set forth in claim 19 further comprising means for storing the complex produced during charging.

* * * * *